US008691163B2

(12) United States Patent
Yotoriyama et al.

(10) Patent No.: US 8,691,163 B2
(45) Date of Patent: Apr. 8, 2014

(54) SAMPLE SOLUTION INTRODUCTION KIT AND SAMPLE SOLUTION INJECTOR

(75) Inventors: Tasuku Yotoriyama, Tokyo (JP); Naohisa Sakamoto, Tokyo (JP); Yuji Segawa, Tokyo (JP); Satomi Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 13/264,291

(22) PCT Filed: Apr. 19, 2010

(86) PCT No.: PCT/JP2010/057302
§ 371 (c)(1),
(2), (4) Date: Oct. 13, 2011

(87) PCT Pub. No.: WO2010/123126
PCT Pub. Date: Oct. 28, 2010

(65) Prior Publication Data

US 2012/0039774 A1 Feb. 16, 2012

(30) Foreign Application Priority Data

Apr. 20, 2009 (JP) ................................ 2009-102099
Apr. 13, 2010 (JP) ................................ 2010-092483

(51) Int. Cl.
*B01J 14/00* (2006.01)

(52) U.S. Cl.
USPC .......................................... 422/500; 422/501

(58) Field of Classification Search
USPC .................................................. 422/500, 501
See application file for complete search history.

(56) References Cited

U.S. PATENT DOCUMENTS

2005/0084424 A1 * 4/2005 Ganesan et al. .............. 422/100
2006/0205085 A1 * 9/2006 Handique et al. ............. 436/177
2008/0219894 A1 * 9/2008 Ganesan et al. ........... 422/82.12

FOREIGN PATENT DOCUMENTS

JP 2007-500510 1/2007
JP 2007-089528 4/2007
JP 2008-249677 10/2008
WO 2005-011867 2/2005
WO 2008-063227 5/2008

OTHER PUBLICATIONS

Biotechnology Journal (2005) 7-8, vol. 5 No. 4, p. 418-420.

* cited by examiner

*Primary Examiner* — Monique Cole
(74) *Attorney, Agent, or Firm* — K&L Gates LLP

(57) ABSTRACT

A sample solution introduction kit and a sample solution injector capable of introducing sample solution while reducing the rate of occurrence of an air bubble and having a simplified structure are proposed.
A sample solution introduction kit includes a plate-like member and a sample solution injector. The plate-like member has a plurality of spaces formed therein and serving as reaction field and a communication space that communicates with the plurality of spaces therein and that has a portion defining an opening formed in a surface of the plate-like member, and the sample solution injector includes a container containing the sample solution, a tube that communicates with the bottom of the container and that is insertable into the opening, a stopper removably fitted into an opening formed at a top end of the tube, and liquid held in the container, and the liquid is insoluble in the sample solution and is lighter than the sample solution.

12 Claims, 13 Drawing Sheets

(A)

(B)

(A)

(B)

SAMPLE SOLUTION INTRODUCTION KIT AND SAMPLE SOLUTION INJECTOR

CROSS REFERENCE TO RELATED APPLICATIONS

The present application is a national stage of International Application No. PCT/JP2010/057302 filed on Apr. 19, 2010 and claims priority to Japanese Patent Application No. 2009-102099 filed on Apr. 20, 2009 and Japanese Patent Application No. 2010-092483 filed on Apr. 13, 2010, the disclosures of which are incorporated herein by reference.

BACKGROUND

The present invention relates to a sample solution introduction kit and a sample solution injector that are suitable in a technical field for amplifying nucleic acid.

In real-time PCR machines or PCR machines, a substrate including a plurality of microcontainers that serve as amplification reaction fields for nucleic acid is used. In an existing technique, a substrate including a carrier, a cover that covers the surface of the carrier and that is bonded to the carrier, and void part provided between the carrier and the cover and corresponding to microcontainers and a flow channel connecting the microcontainers to one another is proposed (refer to NPL 1).

In addition, a device that prevents air bubbles from being generated in void part or from entering the void part when sample solution is introduced into the void part is proposed (refer to PTL 1). The device includes a liquid addition unit into which liquid is added and a liquid introduction unit that introduces liquid into the void part. A liquid passing unit having a porous structure is provided between the liquid addition unit and the liquid introduction unit. The liquid passing unit traps air bubbles existing in liquid added from the liquid addition unit using the porous structure. In addition, the liquid passing unit controls the introduction speed of the liquid using the porosity of the porous structure.

CITATION LIST

Patent Literature

PTL 1: Japanese Unexamined Patent Application Publication No. 2008-249677 (refer to [0073], [0089] to [0092])

Non Patent Literature

NPL 1: Satoko Takizawa, et al. "Biotechnology Journal" July-August Issue, 2005, pp. 418-420

SUMMARY

However, such a porous structure is formed from fibers, fine particles, or a mesh so as to have a predetermined porosity. However, it is cumbersome to produce such a configuration. Furthermore, in general, in the porous structure, variation occurs from hole to hole. Thus, a porous structure may generate air bubbles due to the variation and a physical barrier of the porous structure. Furthermore, the variation may make it difficult to control the introduction speed of the liquid.

Accordingly, the present invention provides a sample solution introduction kit and a sample solution injector having simple structures and capable of introducing sample solution while reducing the rate of occurrence of air bubbles.

To solve the above-described problem, according to the present invention, a sample solution introduction kit includes a plate-like member and a sample solution injector. The plate-like member has a plurality of spaces formed therein and serving as reaction field and a communication space that communicates with the plurality of spaces therein and that has a portion defining an opening formed in a surface of the plate-like member. The sample solution injector includes a container containing sample solution, a tube that communicates with the bottom of the container and that is insertable into the opening, a stopper removably fitted into an opening formed at a top end of the tube, and liquid held in the container, and the liquid is insoluble in the sample solution and is lighter than the sample solution.

In addition, according to the present invention, a sample solution injector for injecting sample solution into a plate-like member having a plurality of spaces that are formed therein and that serve as reaction fields and a communication space that communicates with the plurality of spaces therein and that has a portion defining an opening formed in a surface of the plate-like member is provided. The sample solution injector includes a container for containing the sample solution, a tube for communicating with the bottom of the container, a stopper removably fitted into an opening formed at a top end of the tube, and liquid held in the container, and the liquid is insoluble in the sample solution and is lighter than the sample solution.

According to the present invention, when being held in the container, the sample solution is localized as a lower layer due to liquid that is insoluble in the sample solution and is lighter than the sample solution and, therefore, the sample solution is uniformly pressed by the liquid due to the mass of the liquid.

Accordingly, even if an air bubble is generated in the sample solution or the liquid when the sample solution injector injects the sample solution, the sample solution injector can introduce the sample solution into the spaces of the plate-like member without the air bubble entering the sample solution localized as a lower layer.

In addition, the speed at which the sample solution is introduced can be determined by controlling the amount of the liquid in accordance with the diameter of the opening of the tube of the sample solution injector and the amount of the sample solution to be introduced into the sample container (i.e., the capacity of the spaces in the plate-like member). Accordingly, the control of the speed can be easily performed, and a variation from structure to structure can be prevented. Furthermore, a variation from injector to injector can be prevented, as compared with the case of a porous structure. Still furthermore, commercially available liquid that is insoluble in the sample solution and is lighter than the sample solution can be used as the liquid without additionally being refined. In this way, a sample solution introduction kit and a sample solution injector having a simplified structure and capable of introducing sample solution while reducing the rate of occurrence of an air bubble can be achieved.

Additional features and advantages of the present invention are described in, and will be apparent from, the following Detailed Description and the Figures.

DETAILED DESCRIPTION

Embodiments of the present invention are described below. Note that descriptions are made in the following order:

<1. Embodiment>

[1-1. Structure of Reaction Substrate]

[1-2. Structure of Sample Injector]

[1-3. Procedure of Injecting Sample into Reaction Substrate]

[1-4. Effect, etc.]

<2. Other Embodiments>

<1. Embodiment>

A sample solution introduction kit according to an embodiment is described. According to the present embodiment, the sample solution introduction kit includes a plate-like member having a plurality of reaction fields (hereinafter referred to as a "reaction substrate") and a sample injector that injects sample solution into the reaction fields of the reaction substrate. The reaction substrate and the sample injector are packaged together as a set, which is delivered to the site.

[1-1. Structure of Reaction Substrate]

Figure 1:
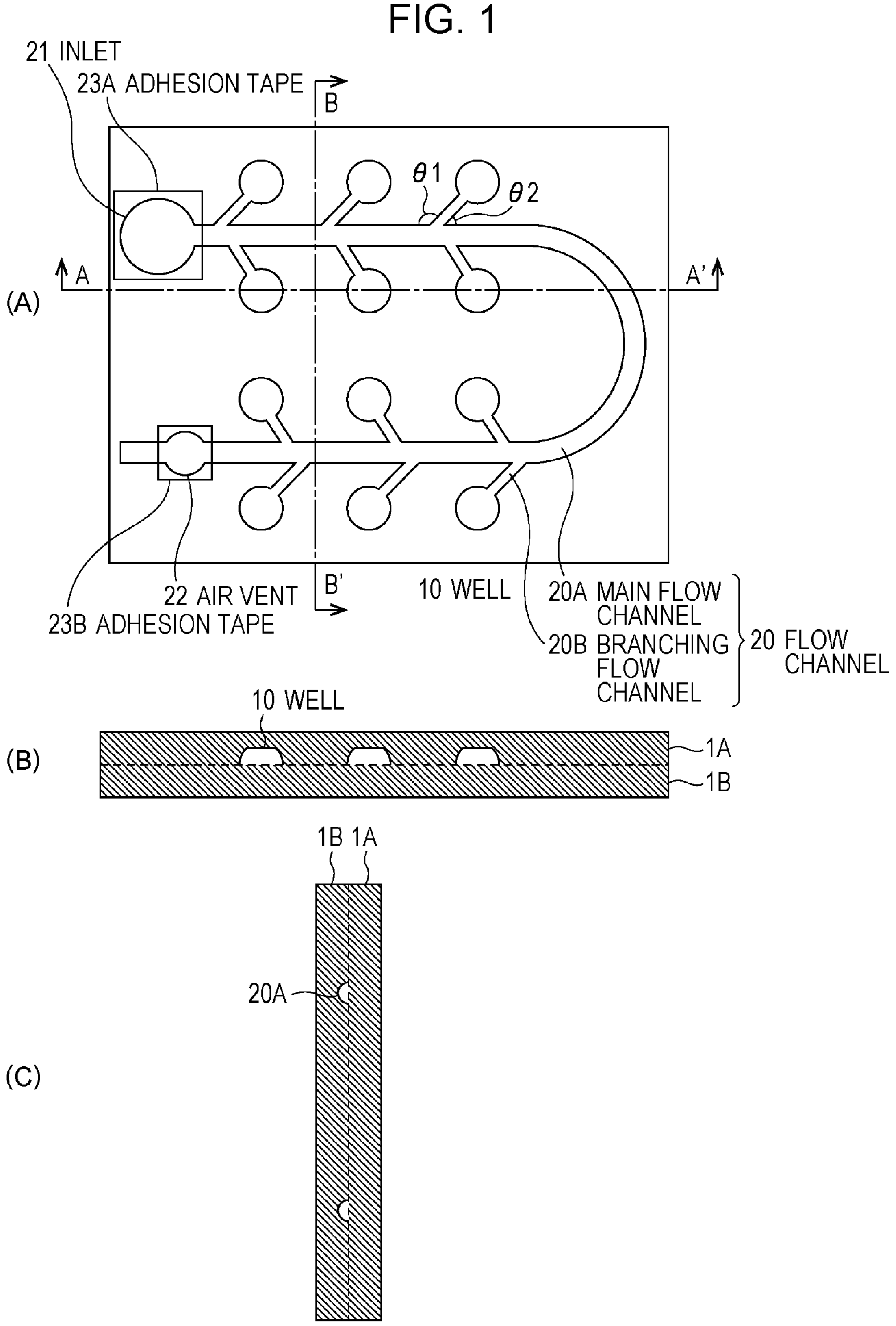
FIG. 1 is a schematic illustration of the structure of a reaction substrate.

According to the present embodiment, the reaction substrate is set in a real-time PCR machine (or a PCR machine) at a predetermined position of a reaction chamber. FIG. 1 is a schematic illustration of the structure of the reaction substrate.

A reaction substrate 1 has a configuration in which a sheet film 1A is bonded to a sheet film 1B by applying heat or ultrasonic waves or using an adhesive agent. PET (polyethylene terephthalate) is used as the material of the sheet films 1A and 1B. For example, each of the sheet films 1A and 1B is 200 [μm] in thickness.

The surface of the sheet film 1A, which is one of the two films, has a plurality of spaces (also referred to as "wells") 10 formed thereon. The spaces are arranged in a lattice. The spaces serve as reaction fields of a material that selectively binds to a target (hereinafter, the material is referred to as a "selective binding substance").

The shape of each of the wells 10 is hemispherical. The diameter of an opening is, for example, 500 [μm], and the depth of the well 10 is, for example, 100 [μm]. A distance between the neighboring wells 10 in a column direction or a row direction is proportional to the diameter of the opening of the well 10. For example, the distance is 1000 [μm]. A curved portion that faces the opening of the well 10 is formed so as to be flat. For example, a primer or enzyme that serves as selective binding substance is fixed to that portion.

When, for example, the reaction substrate 1 having the sides of 6 [cm] is used, about 1600 wells 10 having a capacity of 1 [μL] or less can be formed. Accordingly, the reaction substrate 1 can simultaneously amplify a plurality of target nucleic acids of the same type or different types.

The sheet film 1B, which is the other film, has a communication space (hereinafter also referred to as a "flow channel") 20 formed therein. The flow channel 20 communicates with the plurality of spaces.

The flow channel 20 includes a main line portion that extends from one end to the other end in a row direction for one row and from the other end to the one end for the neighboring row so as to form a zigzag line (hereinafter also referred to as a "main flow channel 20A"). The flow channel 20 further includes branching line portions each connecting the main flow channel to one of the wells 10 (hereinafter also referred to as a "branching flow channel 20B").

One end of the main flow channel 20A opens in the surface of the sheet film 1B that is opposite to the surface of the sheet film 1B bonded to the sheet film 1A, and the one end serves as an inlet 21. The other end of the main flow channel 20A is closed. However, an air vent 22 is formed in the surface of the sheet film 1B at the closed end of the main flow channel 20A. The depth of the flow channel 20 is, for example, [10 μm]. The flow channel width of the main flow channel 20A is, for example, [100 μm]. In addition, the inlet 21 is, for example, 1 [mm], and the air vent 22 is 0.5 [mm] in diameter.

Furthermore, the flow channel 20 has a structure so that the resistance to solution that includes the target nucleic acids (hereinafter referred to as "sample solution") and that is introduced through the inlet 21 is reduced. For example, each connecting portion of the main flow channel 20A that connects a row portion to the next row portion is curved. The cross-sectional dimensions of each of the branching flow channels 20B are smaller than those of the main flow channel 20A. The branching flow channel 20B is connected to the main flow channel 20A so that an angle θ1 formed by the main flow channel 20A and the flow direction is smaller than an angle θ2 formed by the main flow channel 20A and a direction that is opposite to the flow direction. The branching flow channels 20B connected to the wells 10 located on one of the row sides and the branching flow channel 20B connected to the wells 10 located on the other row side are alternately disposed along the flow direction. The cross sections of the main flow channel 20A and the branching flow channel 20B are semicircular.

Accordingly, when sample solution is introduced into the reaction substrate 1 through the inlet 21, the reaction substrate 1 can efficiently deliver the sample solution to the wells 10 while significantly reducing air bubbles generated. Note that the sample solution is appropriately adjusted using, for example, buffer fluid, enzyme, dNTP, or a fluorochrome.

In the reaction substrate 1 according to the present embodiment, each of the inlet 21 and the air vent 22 is sealed with a transparent sheet-like adhesive agent (hereinafter referred to as an "adhesion tape") 23 (23A, 23B). Each of the wells 10 and the flow channel 20 is maintained at low pressure (e.g., lower than or equal to 10 [Torr]). Accordingly, the reaction substrate 1 is designed to further efficiently deliver the sample solution introduced through the inlet 21.

[1-2. Structure of Sample Injector]

Figure 2:
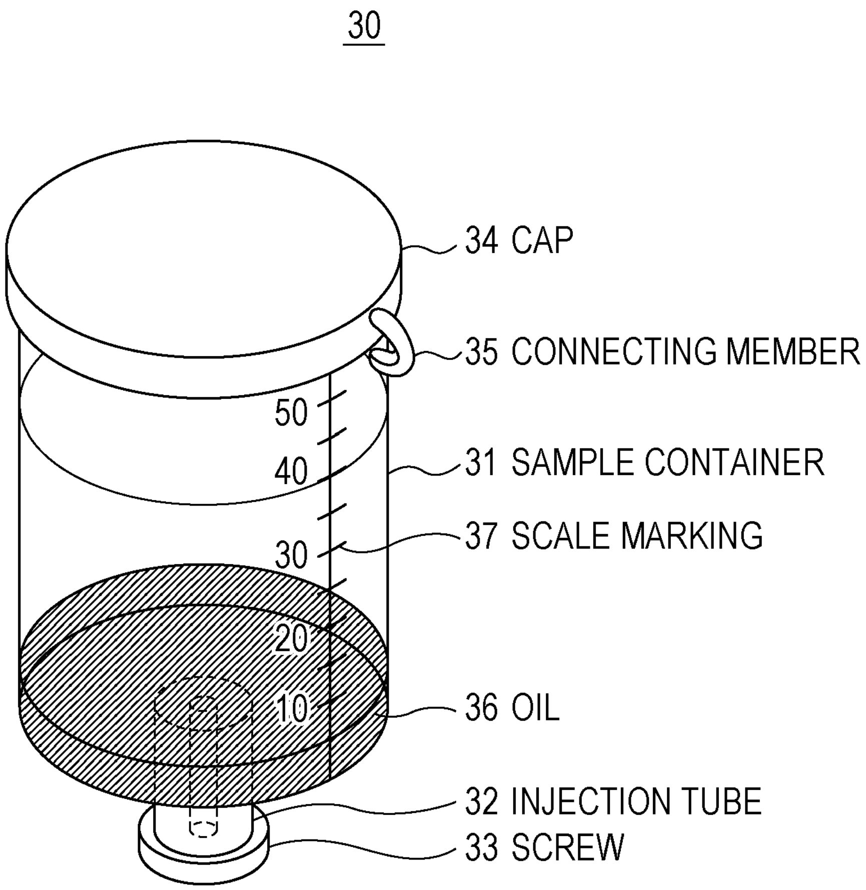
FIG. 2 is a schematic illustration of the structure of a sample injector.

Subsequently, FIG. 2 is a schematic illustration of the structure of a sample injector. A sample injector 30 includes a container 31 that holds the sample solution (hereinafter referred to as a "sample container"). The sample container 31 is formed of a transparent plastic material so as to have a cylindrical body.

A tube 32 used for introducing liquid held in the sample container 31 into the flow channel 20 (hereinafter the tube is also referred to as an "injection tube 32") is integrally formed with the sample container 31 at the center of the outer bottom surface of the sample container 31. A device 33 is removably fitted into the opening of the injection tube 32 so as to plug the opening of the injection tube 32 (hereinafter the device is also referred to as a "screw 33").

The length of the injection tube 32 is determined so that the injection tube 32 extends from the surface of the inlet 21 (FIG. 1) to a point just before the surface of the flow channel 20 in the depth direction. The outer bottom surface of the sample container 31 other than the injection tube 32 has dimensions so that the sample container 31 can stand erect on the surface of the reaction substrate 1 when the entirety of the injection tube 32 is disposed in the inlet 21.

On the one hand, a cap 34 of the sample container 31 is attached to the outer side surface of the top of the sample container 31 using a flexible connecting member 35. The sample container 31 contains liquid (hereinafter also referred to as "oil") 36 that is insoluble in the sample solution and that is lighter than the sample solution.

Silicon oil having a liquid viscosity that is substantially the same as that of water is used as the oil 36. The amount of the oil 36 to be held in the sample container 31 is proportional to, for example, the capacity of the wells 10 and the flow channel 20 (the main flow channel 20A and the branching flow channel 20B) of the reaction substrate 1.

On the other hand, scale markings 37 indicating the capacity are marked on the outer side surface of the sample container 31. Among the scale markings 37, the scale marking 37 indicating the sum of the capacity of the wells 10 and the flow channel 20 and the capacity of the oil 36 is emphasized, as compared with other scale markings.

[1-3. Procedure of Injecting Sample into Reaction Substrate]

Figure 3:
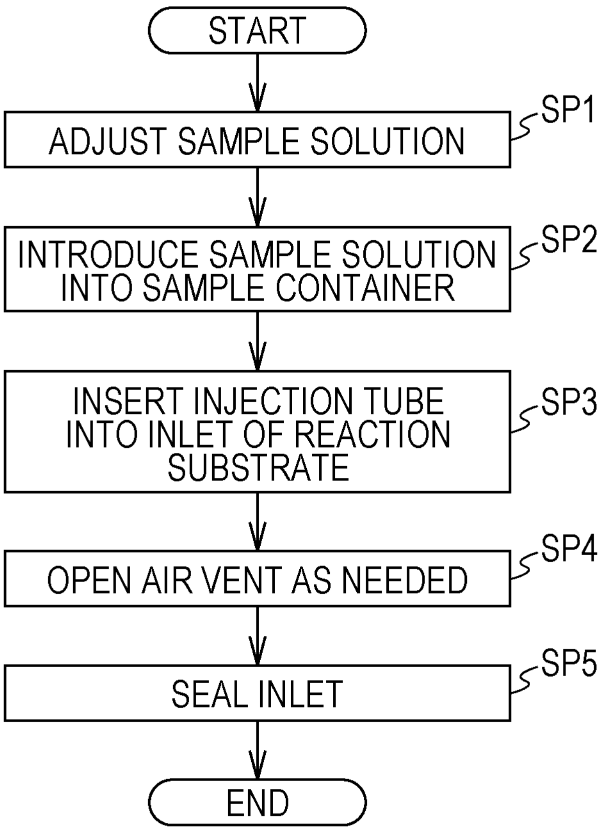
FIG. 3 is a flowchart illustrating the procedure of introducing sample solution into the reaction substrate.
Figure 4:
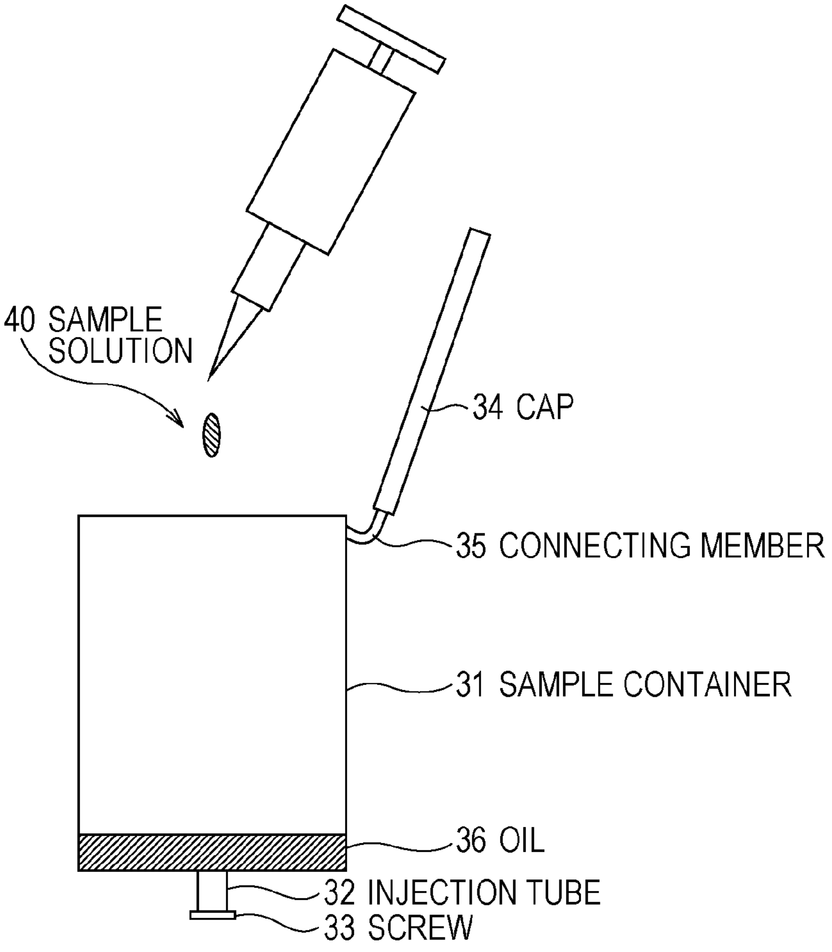
FIG. 4 is a cross-sectional view illustrating the states before and after sample solution is introduced.
Figure 4:
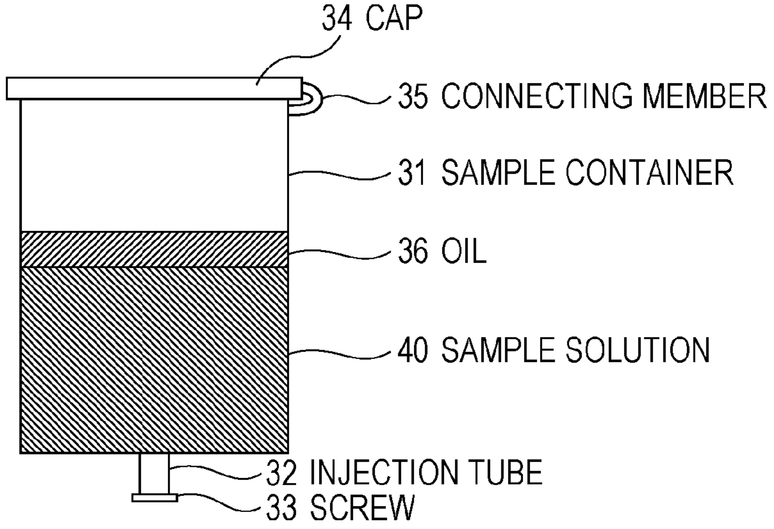

The procedure of injecting a sample into the reaction substrate is described next with reference to FIG. 3. The procedure is described with reference to FIGS. 4 to 8 as needed. Note that FIGS. 4 to 8 are cross-sectional views taken along the main flow channel 20A.

That is, in a first step SP1, sample solution to be injected into the flow channel 20 of the reaction substrate 1 is adjusted. The scale markings 37 indicating the capacity are marked on the surface of the sample container 31, and the scale marking 37 indicating the sum of the capacity of the oil 36 contained in the sample container 31 and the capacity of the wells 10 and the flow channel 20 of the reaction substrate 1 is emphasized, as compared with other scale markings.

Accordingly, by using the current amount of the oil and the emphasized scale marking of the sample container 31, the amount of the sample solution to be adjusted can be identified. As a result, excess or shortage of the sample solution with respect to the reaction substrate 1 can be prevented in advance.

In a second step SP2, as shown in FIG. 4(A), the cap 34 is removed from the sample container 31 of the sample injector 30, and sample solution 40 is introduced into the sample container 31. The sample container 31 contains the oil 36 in advance. The oil 36 is liquid that is insoluble in the sample solution 40 and is lighter than the sample solution 40.

Therefore, the sample solution 40 starts being localized in lower part of the oil 36. As shown in FIG. 4(B), the sample solution 40 and the oil 36 form lower and upper separate layers, respectively. Thus, the sample injector 30 can hold the sample solution 40 in the sample container 31 thereof without generating an air bubble in the sample solution 40.

In addition, in the second step SP2, when the cap 34 is removed from the sample container 31, loss of the cap 34 can be prevented, since the cap 34 is connected to the outer side surface of the sample container 31 using the connecting member 35.

Note that as shown in FIG. 4(A), a pipette is used as a device for introducing the sample solution 40 into the sample container 31. However, the device is not limited to a pipette.

Figure 5:
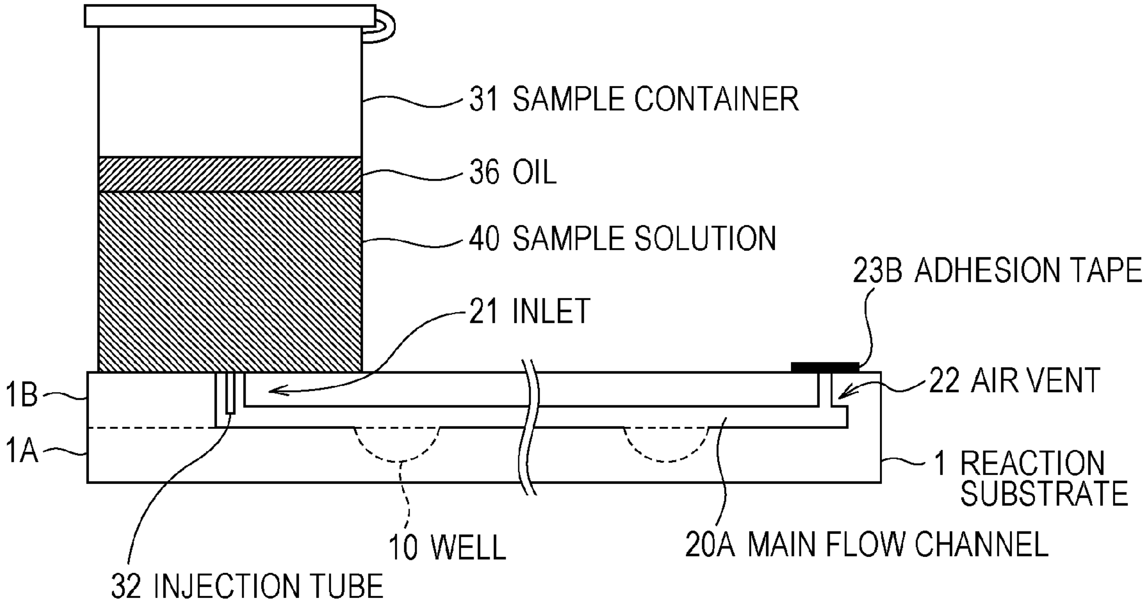
FIG. 5 is a cross-sectional view illustrating insertion of an injection tube.
Figure 6:
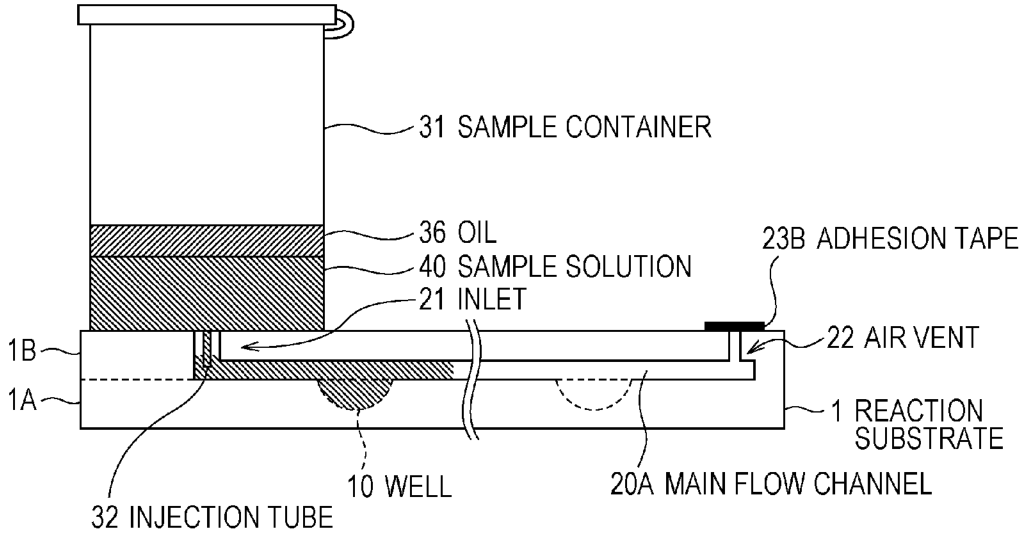
FIG. 6 is a cross-sectional view illustrating injection of sample solution.
Figure 6:
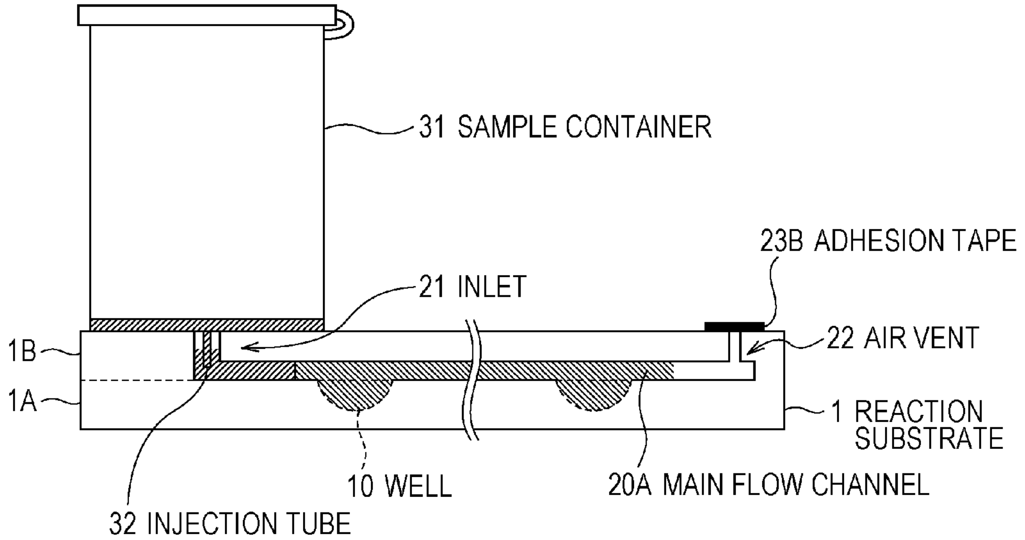

In a third step SP3, a screw 33 fitted into an opening formed at the top end of the injection tube 32 of the sample injector 30 is removed. As shown in FIG. 5, the injection tube 32 is inserted into the inlet 21 of the reaction substrate 1 while passing through the adhesion tape 23A.

As a result, as shown in FIG. 6(A), the sample solution 40 held in the sample container 31 is uniformly pressed by atmospheric pressure applied to the top surface of the oil 36. In this way, the sample solution 40 promptly flows into the wells 10 via the injection tube 32 at a constant flow velocity. After the entirety of the sample solution 40 has flowed in from the sample container 31, the oil 36, which forms the upper layer on the sample solution 40, flows in, as shown in FIG. 6(B).

Accordingly, the sample injector 30 can load the sample solution 40 into all of the wells 10 without generating an air bubble in the wells 10 or the flow channel 20. In addition, evaporation of the sample solution 40 through the inlet 21 can be significantly reduced due to the presence of the oil 36.

Note that since the adhesion tape 23A is transparent, the inlet 21 is visible. Accordingly, for the reaction substrate 1, the injection tube 32 can be smoothly inserted into the inlet 21. In addition, the area of the outer bottom surface of the sample container 31 other than the injection tube 32 has dimensions so that the sample container 31 can stand erect on the surface of the reaction substrate 1 when the entirety of the injection tube 32 is disposed in the inlet 21. Therefore, the sample injector 30 allows a user to inject the sample solution without touching the sample injector 30.

Furthermore, the length of the injection tube 32 is determined so that the injection tube 32 extends from the surface of the inlet 21 (FIG. 1) to a point just before the surface of the flow channel 20 in the depth direction. Therefore, when the entirety of the injection tube 32 is disposed in the inlet 21, the top end of the injection tube 32 is located in the space of the flow channel 20 without being in contact with a bonding surface of the sheet film 1B used for forming the flow channel 20 and the sheet film 1A bonded to the sheet film 1B. Thus, the sample injector 30 can inject the sample solution 40 without creating unnecessary resistance to the sample solution 40 as compared in the case where the top end of the injection tube 32 is in contact with the bonding surface.

Incidentally, an experiment was conducted in which sample solution is injected, using the sample injector 30, into a reaction substrate having wells as shown in FIG. 2 and the above-described structure of flow channels for the wells. In the experiment, it took about 1 [second] to empty the sample container 31 including the sample solution 40 and the oil 36. As can be seen from this experiment, the sample injector 30 can significantly reduce a period of time required for delivering the sample solution to the wells, as compared with the case in which the sample solution is manually delivered.

Figure 7:
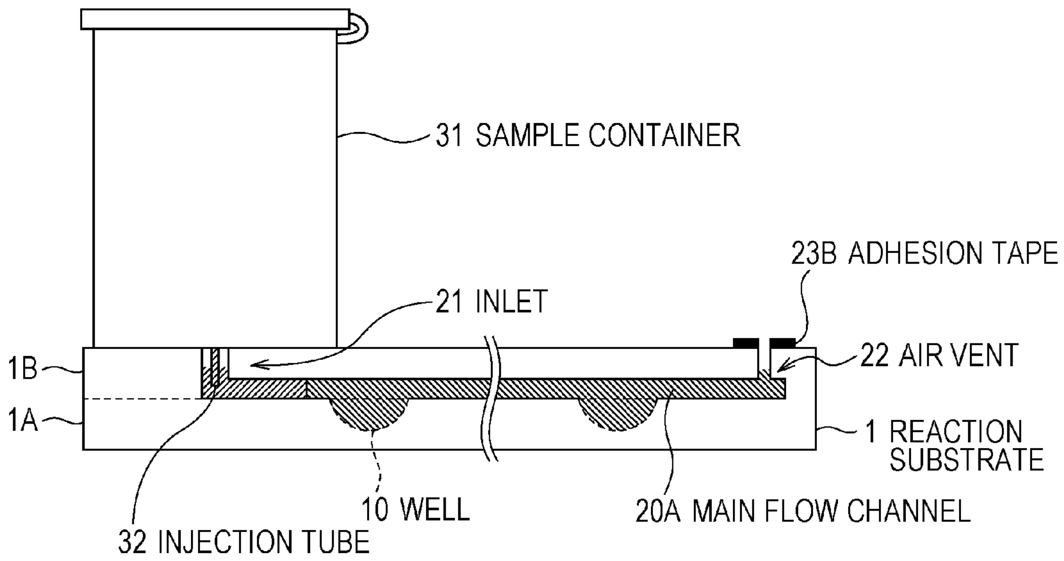
FIG. 7 is a cross-sectional view illustrating an air vent when the air vent is opened.

In a fourth step SP4, if, as shown in FIG. 7, the oil 36 remains in the sample container 31 or the flow of the sample solution 40 stops before completion of delivery, the adhesion tape 23B is drilled by the screw 33 removed from the top end of the injection tube 32. Thus, the air vent 22 is opened.

As a result, the sample solution 40 flows to even the air vent 22. The sample solution 40 or the oil 36 remaining in the sample container 31 promptly flows in, and the oil 36 stays in the main flow channel 20A in the vicinity of the inlet 21.

Figure 8:
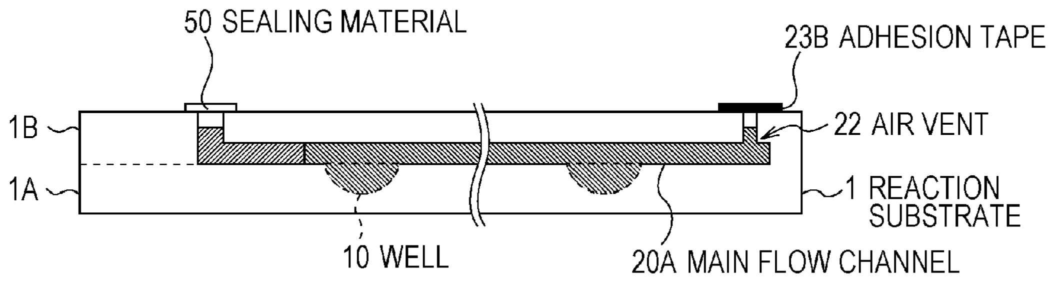
FIG. 8 is a cross-sectional view illustrating a sealing operation performed after sample solution has been loaded.

In a fifth step SP5, as shown in FIG. 8, the screw 33 is inserted into the air vent 22 of the reaction substrate 1 again. Thereafter, the inlet 21 is sealed using a sealing material 50, such as an adhesion tape, paraffin, or glycerin jelly.

[1-4. Effect, etc.]

In the above-described structure, the liquid (the oil 36) that is insoluble in the sample solution 40 and is lighter than sample solution 40 is preloaded into the sample container 31 of the sample injector 30 into which the sample solution 40 is to be introduced (refer to FIG. 2).

When the sample solution 40 is introduced in the sample container 31, the sample injector 30 localizes the sample solution 40 in a lower layer that sinks to the bottom of the oil 36. In addition, the sample injector 30 evenly applies pressure to the sample solution 40 using atmospheric pressure applied to the top surface of the oil 36 (refer to FIG. 6).

In this way, even when air bubbles are generated in the sample solution 40 and the oil 36 at an introduction time of the sample solution 40, the sample injector 30 can introduce the sample solution 40 into the reaction substrate 1 without moving air bubbles into the sample solution 40 localized as the lower layer.

The speed at which the sample solution 40 is introduced can be determined by controlling the amount of the oil 36 in accordance with the diameter of the opening of the injection tube 32 and the amount of the sample solution 40 to be held in the sample container 31 (i.e., the capacity of the spaces of the wells 10 and the flow channel 20 of the reaction substrate 1). Accordingly, control of the speed can be easily performed, as compared with the case of a porous structure. In addition, a variation from injector to injector can be prevented.

Furthermore, the oil 36 need not be additionally refined. For example, commercially available oil can be used as the oil 36. Thus, the sample injector 30 having a simplified structure can be achieved.

According to the above-described structure, the sample solution 40 is localized as a lower layer that sinks to the bottom of the oil 36. In addition, the sample solution 40 evenly receives pressure due to the weight of the oil 36. Thus, the sample injector 30 having a simplified structure and capable of introducing sample solution while reducing the rate of occurrence of an air bubble can be achieved.

<2. Other Embodiments>

While the above embodiment has been described with reference to a plate-like member (the reaction substrate 1) including a plurality of spaces (the wells 10) serving as reaction fields of the target nucleic acids to be amplified and a material having a characteristic to be selectively coupled with the target nucleic acids, the use of the reaction fields is not limited to reaction fields of the target nucleic acids to be amplified and a material having a characteristic to be selectively coupled with the target nucleic acids.

For example, the plurality of spaces can be used for reaction with the target nucleic acids to be detected and a material having a characteristic to be selectively coupled with the target nucleic acids, reaction with a material having a characteristic to be selectively coupled with protein (e.g., an antibody) to be detected, or reaction with a material having a characteristic to be selectively coupled with a sugar chain (e.g., an antibody) to be detected.

In addition, while the above embodiment has been described with reference to a hemispherical space, the shape of the space is not limited thereto. A variety of shapes can be employed (e.g., a shape having an elliptical cross section, a rectangular cross section, or a trapezoidal cross section). However, in order to obtain efficient flow of the sample solution, it is desirable that the well 10 have a curved shape (i.e., no sharp corner).

In addition, while the above embodiment has been described with reference to the spaces arranged in a lattice, the arrangement of the spaces is not limited thereto. Any arrangement can be employed. Furthermore, all of the neighboring spaces are separated. However, part of the neighboring spaces (e.g., upper sections of the spaces) may be in contact with each other.

In conclusion, any reaction field formed from a plurality of spaces in a plate-like member can be employed.

Furthermore, in the above-described embodiment, a communication space (the flow channel 20) is formed in a plate-like member (the reaction substrate 1), and the communication space includes a main line portion (the main flow channel 20A) that extends from one end to the other end in a row direction for one row and from the other end to the one end for the neighboring row so as to form a zigzag line and branching line portions (the branching flow channels 20B) each connecting the main flow channel to one of the wells 10. However, the form of communication is not limited thereto.

Figure 9:
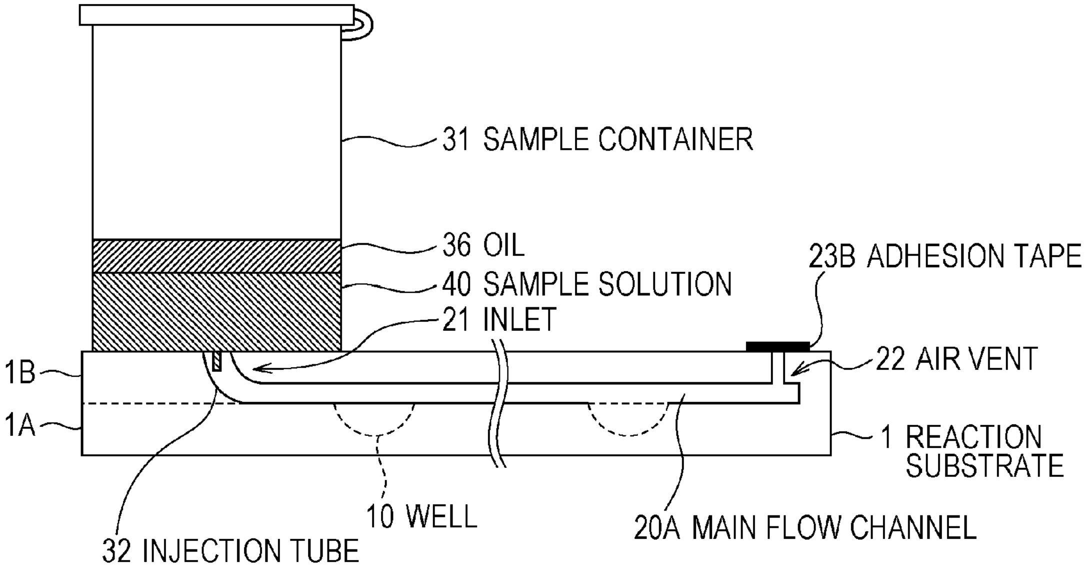
FIG. 9 is a schematic illustration of a flow channel according to another embodiment.

For example, the form of communication in which an opening formed in the surface of a plate-like member (the reaction substrate 1) communicates with each of the wells 10 may be employed. Alternatively, the form of communication in which wells that neighbor in the row direction communicate with each other and some or all of the wells that neighbor in the column direction communicate each other may be employed. Note that in order to obtain efficient flow of the sample solution, it is desirable that, as shown in FIG. 9, the communication space (the flow channel 20) through which the inlet 21 formed on the surface of the plate-like member (the reaction substrate 1) communicates with each of the wells partially has a shape of a curved line (no sharp corners) in the vicinity of the inlet 21.

In addition, while the above embodiment has been described with reference to the air vent 22 formed in the front surface, the air vent 22 may be formed in the side surface. Furthermore, while the above embodiment has been described with reference to a single air vent 22, the number of the air vents 22 may be plural. Note that the air vent 22 is not necessarily an essential component.

In conclusion, any reaction substrate including a plurality of spaces serving as reaction fields and a communication space that internally communicates with the plurality of spaces and that has an opening in the surface thereof can be employed.

Furthermore, while the above embodiment has been described with reference to the structure in which a plate-like member (the reaction substrate 1) is formed by bonding the PET film 1A having the wells 10 therein to the PET film 1B having the flow channel 20 formed therein, the structure of the plate-like member is not limited thereto. For example, a plate-like member (the reaction substrate 1) in which the wells 10 and the flow channel 20 are formed in the surface of a carrier and a cover member is bonded to the surface may be employed. Alternatively, a three-layer structure may be employed in which a layer in which the wells 10 and the flow channel 20 are to be formed is formed of a silicon resin, and the silicon resin layer is sandwiched by glass layers. In addition to these examples, a wide variety of applications are available. In conclusion, as described above, any plate-like member including a plurality of spaces serving as reaction fields and a communication space that internally communicates with the plurality of spaces and that has an opening in the surface thereof can be employed.

Still furthermore, while the above embodiment has been described with reference to PET (polyethylene terephthalate) as the material of the plate-like member (the reaction substrate 1), the material of the plate-like member is not limited thereto. For example, a variety of plastic materials, such as polyethylene, polypropylene, polycarbonate, polyolefin, acrylate resin, silicon resin, or glass can be employed.

Still furthermore, while the above embodiment has been described with reference to the cylindrical sample container 31 made of a transparent plastic material, the degree of transparency, the material, and the shape of the sample container are not limited thereto. A variety of forms can be employed.

Still furthermore, in the above-described embodiment, the sample container 31 having an open top end is employed. However, the top end may be sealed. In such a case, by introducing the sample solution using a syringe, an advantage that is the same as the advantage of the above-described embodiment can be provided. However, in terms of user friendliness, the above-described embodiment is preferable.

Still furthermore, while the above embodiment has been described with reference to the inlet 21 or the air vent 22 sealed using a transparent sheet adhesive agent (the adhesion tape 23), a variety of materials that allow the injection tube 32 or the screw 33 to pass therethrough and that can seal the inlet 21 or the air vent 22 can be employed.

Still furthermore, while the above embodiment has been described with reference to a scale marking that indicates an amount substantially the same as the capacity of the wells 10 and the flow channel 20 (the main flow channel 20A and the branching flow channels 20B) in the reaction substrate 1 and that is emphasized more than other markings, the display form is not limited thereto. For example, a display form in which a line or an arrow may be marked in addition to the scale markings. In conclusion, any indicator that indicates the amount of the oil 36 and any indicator that indicates the sum of the capacities of a plurality of the spaces (the wells 10) and the communication space (the flow channel 20) can be employed.

Figure 10:
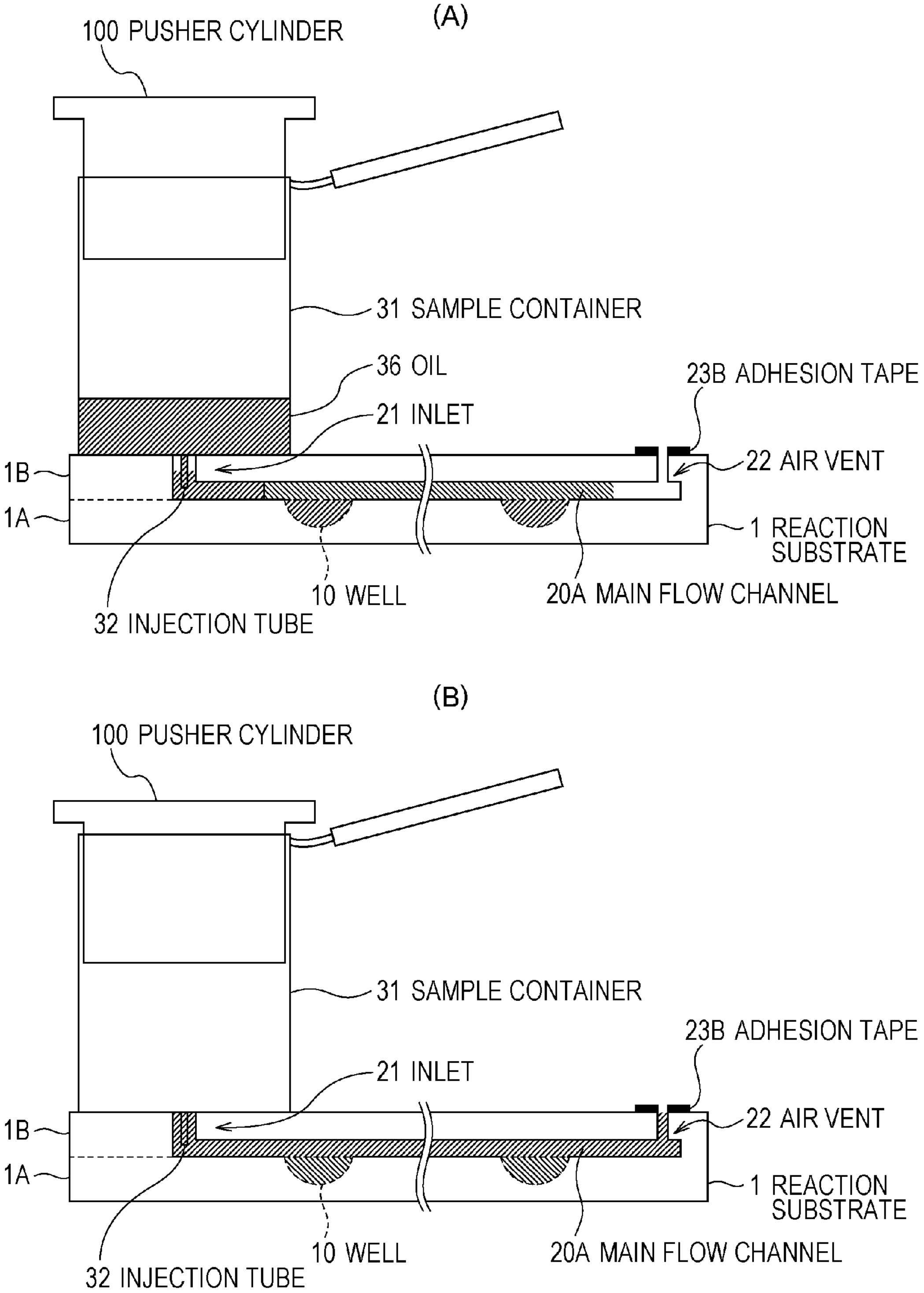
FIG. 10 is a cross-sectional view illustrating injection using a sample injector according to another embodiment.

Still furthermore, while the above embodiment has been described with reference to such an amount of the oil 36 that stays in the vicinity of the inlet 21, the amount of the oil 36 may be substantially the same as the capacity of the flow channel 20 (the main flow channel 20A and the branching flow channels 20B). In such a case, for example, as shown in FIG. 10, an additional member of the sample injector 30 can be provided. The member is removable from the sample injector 30 and is used for pressing the oil 36 held in the sample container 31 into the flow channel 20 (hereinafter, this member is referred to as a "pusher cylinder 100"). In the above-described fourth step SP4 (FIG. 7), after the air vent 22 is opened by using the screw 33, the oil 36 is pressed into the flow channel 20 through the inlet 21 by using the pusher cylinder 100.

The oil 36 is liquid that is lighter than the sample solution. Therefore, the oil 36 is loaded into only the flow channel 20 without entering the wells 10. Thus, the sample injector 30 can significantly reduce evaporation of the sample solution in the wells 10 due to the oil 36 loaded into the flow channel 20. In addition, the oil 36 loaded into the flow channel 20 prevents the sample solution in the wells 10 from flowing out of the wells 10 and, therefore, exchange of the sample solution among the wells 10 can be prevented. As a result, contamination of the sample solution can be prevented.

Still furthermore, while the above embodiment has been described with reference to the wells 10 and the flow channel 20 of the reaction substrate 1 maintained at low pressure, the wells 10 and the flow channel 20 of the reaction substrate 1 may be maintained as a vacuum or at atmospheric pressure.

Figure 11:
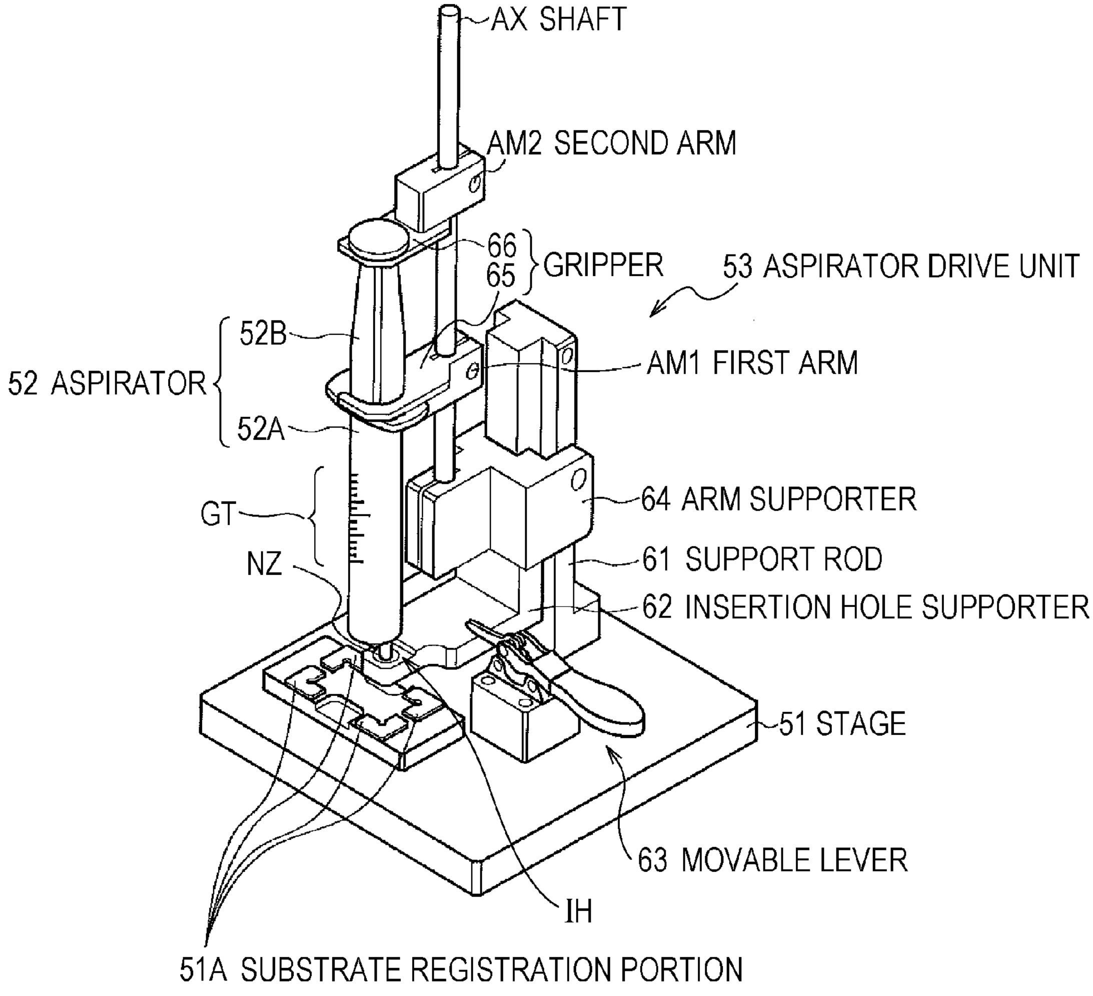
FIG. 11 is schematic illustration of the structure of a decompression device.

Note that if the wells 10 and the flow channel 20 are maintained at atmospheric pressure, the pressure in the wells 10 and the flow channel 20 can be changed to a vacuum or low pressure at the site by using a decompression device. Here, FIG. 11 illustrates a decompression device. The decompression device includes a stage 51 on which the reaction substrate 1 is to be placed, an aspirator 52 that sucks air in the wells 10 and the flow channel 20 of the reaction substrate 1, and an aspirator drive unit 53 that drives the aspirator 52.

The stage 51 includes substrate registration portions 51A that restrict movement of the reaction substrate 1 in a side surface direction and hold the reaction substrate 1 in position. For example, as shown in FIG. 11, each of the substrate registration portions 51A is in the form of an L frame that is to be in contact with the side surfaces of the corner portion of the reaction substrate 1.

The aspirator 52 includes a cylindrical tube (hereinafter referred to as a "syringe") 52A and a rod-like piston 52B having a packing at the top end thereof.

A nozzle NZ is formed at the top end of the syringe 52A. Scale markings GT are marked on the outer peripheral surface of the syringe 52A so as to indicate the level of reduced pressure. One of the scale markings GT that indicates a target level of reduced pressure is highlighted more than the other markings. More specifically, the scale marking indicating the level of reduced pressure under which liquid of a volume corresponding to one of the scale markings 37 highlighted on the sample container 31 flows to the air vent 22 at such a speed that does not generate air bubbles is highlighted as a target level of reduced pressure.

The aspirator drive unit 53 has a mechanism for securing the syringe 52A in a direction perpendicular to the air vent 22 when the nozzle NZ is brought into pressure contact with the air vent 22 of the reaction substrate 1 placed on the stage 51 at a predetermined location.

More specifically, in the example shown in FIG. 11, a support rod 61 that is perpendicular to the stage 51 is provided at a location separated from the substrate registration portion 51A by a predetermined distance. The support rod 61 has a portion 62 for supporting a hole IH into which the top end of the nozzle NZ of the syringe 52A is inserted (hereinafter referred to as an "insertion hole") at a location separated from the air vent 22 of the reaction substrate 1 disposed in position by a predetermined distance. Hereinafter, the portion is referred to as an "insertion hole supporter".

Figure 12:
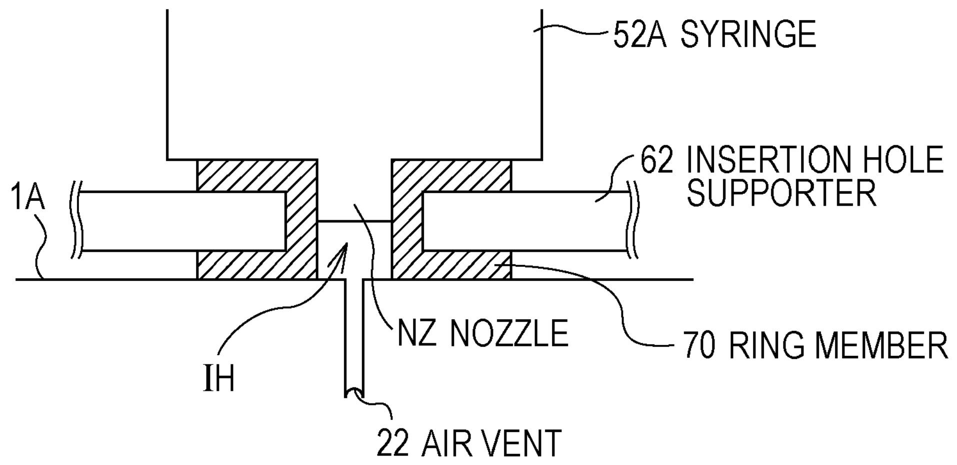
FIG. 12 is a cross-sectional view schematically illustrating the structure of an insertion hole and the vicinity of the insertion hole.

As shown in FIG. 12, a ring member 70, such as an O ring or a gasket, is attached the insertion hole IH so as to cover the inner peripheral surface and the corner of the insertion hole IH. When a movable lever 63 is located at a predetermined standby position, the ring member 70 is not in contact with the upper surface of the reaction substrate 1 held in position. However, when the movable lever 63 is moved from the standby position and is fixed at a predetermined pressuring position, the ring member 70 is urged against an upper surface 1A of the reaction substrate 1 held in position so as to cover the air vent 22, as shown in FIG. 12. Thus, leakage of gas from a gap formed between the nozzle NZ inserted into the ring member 70 and the air vent 22 can be prevented.

In addition, the support rod 61 has a portion (hereinafter referred to as an "arm supporter") 64 for supporting a rod-like shaft AX to which a first arm AM1 and a second arm AM2 are attached so that the rod-like shaft AX is perpendicular to the surface of the stage 51. The first arm AM1 is secured to the shaft AX. The first arm AM1 has a portion (hereinafter referred to as a "gripper") 65 that can grip a syringe in accordance with the diameter of the syringe to be gripped. The second arm AM2 is slidable along the shaft AX. A gripper 66 is provided at the top end of the second arm AM2. Note that the second arm AM2 is slidable by hand. The aspirated volume increases with an increase in distance by which the second arm AM2 is slided in a direction away from the first arm AM1.

Note that an example of the procedure for reducing pressure using the decompression device is described next. First, the nozzle NZ of the syringe 52A is inserted into the ring member 70 of the insertion hole IH from the above. Subsequently, the syringe 52A is inserted into the gripper 65 of the first arm AM1 and is griped by the gripper 65, and the piston 52B to be placed at the bottom end of the nozzle NZ is inserted into the gripper 66 of the second arm AM2 and is gripped by the second arm AM2. Subsequently, the movable lever 63 is moved from a predetermined standby position to a predetermined pressuring position and is fixed at the pressuring position. In this way, the insertion hole IH is urged against the upper surface of the reaction substrate 1 held in place. At that time, the second arm AM2 is slided in the direction away from the first arm AM1. As a result, air located in the wells 10 and the flow channel 20 of the reaction substrate 1 is sucked and, therefore, the pressure of the reaction substrate 1 is reduced.

When reduction in the pressure of the reaction substrate 1 is completed, the injection tube 32 of the sample injector 30 including the sample container 31 containing the oil 36 and the sample solution 40 is inserted into the inlet 21 of the reaction substrate 1 while passing through the adhesion tape 23A.

Note that the decompression device may have a portion (hereinafter referred to as an "injector pressing supporter") for supporting the sample injector 30 having the injection tube 32 disposed in the inlet 21 of the reaction substrate 1 held in place with the sample injector 30 being urged against the reaction substrate 1.

Although, for simplicity, the injector pressing supporter is not shown in FIG. 11, the injector pressing supporter, more specifically, serves as a third arm that is slidable along the shaft AX under the first arm AM1 and that is securable to the shaft AX at any position, for example. The third arm has a gripper at the top end thereof. The sample injector 30 containing the oil 36 and the sample solution 40 is inserted into the third arm and is gripped by the third arm. In such a state, the injection tube 32 of the sample injector 30 is inserted into the inlet 21 of the reaction substrate 1 while passing through the adhesion tape 23A. At that time, the third arm is moved in a slidable manner in a direction away from the first arm AM1 and is fixed at a position at which the sample injector 30 is pressed. If the injector pressing supporter is provided, falling of the sample injector 30 is reliably prevented while the sample solution 40 is being introduced into the reaction substrate 1.

Figure 13:
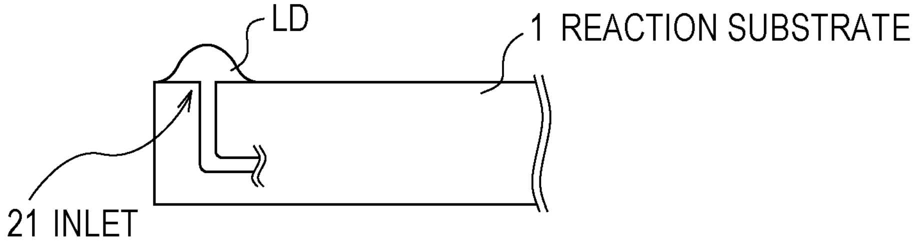
FIG. 13 is a cross-sectional view illustrating a droplet placed in an inlet.

Furthermore, when air in the wells 10 and the flow channel 20 of the reaction substrate 1 is sucked using the decompression device, the sample solution 40 can be simultaneously introduced into the reaction substrate 1. In such a case, as shown in FIG. 13, before air is sucked from the reaction substrate 1, the sample solution 40 is disposed in the inlet 21 with the screw 33 removed in the form of a droplet LD using, for example, a pipette. Thereafter, the second arm AM2 is moved in a slidable manner in a direction away from the first arm AM1. Thus, air in the wells 10 and the flow channel 20 of the reaction substrate 1 can be sucked and the sample solution 40 can be introduced into the reaction substrate 1 at the same time.

In such a case, the pressure of the reaction substrate 1 can be reduced and a sample can be introduced into the reaction substrate 1 without using the sample injector 30. Thus, the structure can be simplified, as compared with the above-described embodiment. However, if the volume of the wells 10 and the flow channel 20 of the reaction substrate 1 is larger than the amount of the droplet LD placed in the inlet 21, a technique of adding a droplet LD without generating an air bubble before the entirety of the droplet LD enters the reaction substrate 1 is needed.

INDUSTRIAL APPLICABILITY

The present invention is applicable to a biotechnology industry, such as gene testing, development of a novel medicine, or follow-up of a patient.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

REFERENCE SIGNS LIST

1 reaction substrate
1A, 1B film
10 well
20 flow channel
20A main flow channel
20B branching flow channel
21 inlet
22 air vent
30 sample injector
31 sample container
32 injection tube
33 screw
34 cap
35 connecting member
36 oil
37, GT scale marking
40 sample solution
51 stage
52 aspirator
53 aspirator drive unit
61 support rod
62 insertion hole supporter
63 movable lever
64 arm supporter
65, 66 gripper
70 ring member
AM1 first arm
AM2 second arm
AX shaft
IH insertion hole
LD droplet

The invention claimed is:

1. A sample solution introduction kit comprising:

a plate-like member; and a sample solution injector;

wherein the plate-like member has a plurality of spaces formed therein and serving as reaction field and a communication space that communicates with the plurality of spaces therein and that has a portion defining an opening formed in a surface of the plate-like member, and wherein the sample solution injector includes a container containing the sample solution, a tube that communicates with the bottom of the container and that is insertable into the opening, a stopper removably fitted into an opening formed at a top end of the tube, and liquid held in the container, and the liquid is insoluble in the sample solution and is lighter than the sample solution.

2. The sample solution introduction kit according to claim 1 wherein the opening is sealed with a member that allows the tube to pass therethrough, and wherein the plurality of spaces and the communication space are maintained at a pressure lower than atmospheric pressure.

3. The sample solution introduction kit according to claim 2, wherein an air vent that communicates with the communication space is formed in a surface of the plate-like member, and wherein the air vent is sealed with a member that allows the stopper to pass therethrough.

4. The sample solution introduction kit according to claim 3, wherein when the entirety of the tube is disposed in the opening, the bottom surface of the container other than the area of a communication portion of the tube has a shape so that the container stands erect on the surface of the plate-like member.

5. The sample solution introduction kit according to claim 3, wherein the liquid is loaded into the communication space and prevents the sample solution held in the container from flowing out of the container.

6. The sample solution introduction kit according to claim 4, wherein marking indicating the sum of the capacity of the liquid and the capacities of the plurality of the spaces and the communication space is marked on the side surface of the container.

7. A sample solution injector for injecting sample solution into a plate-like member having a plurality of spaces that are formed therein and that serve as reaction fields and a communication space that communicates with the plurality of spaces therein and that has a portion defining an opening formed in a surface of the plate-like member, the sample solution injector comprising:

a container for containing the sample solution;

a tube for communicating with the bottom of the container;

a stopper removably fitted into an opening formed at a top end of the tube; and liquid held in the container, the liquid being insoluble in the sample solution and lighter than the sample solution.

8. The sample solution injector according to claim 7, wherein the tube is inserted while drilling a member sealing the opening with the plurality of spaces and the communication space being maintained at a pressure lower than atmospheric pressure.

9. The sample solution injector according to claim 8, wherein the stopper is inserted while drilling a member sealing an air vent that communicates with the communication space.

10. The sample solution injector according to claim 9, wherein when the entirety of the tube is disposed in the opening, the bottom surface of the container other than the area of a communication portion of the tube has a shape so that the container stands erect on the surface of the plate-like member.

11. The sample solution injector according to claim 9, wherein the liquid is loaded into the communication space and prevents the sample solution held in the container from flowing out of the container.

12. The sample solution injector according to claim 10, wherein a marking indicating the sum of the capacity of the liquid and the capacities of the plurality of the spaces and the communication space is marked on the side surface of the container.

* * * * *